(12) United States Patent
Hwang et al.

(10) Patent No.: US 9,438,801 B2
(45) Date of Patent: Sep. 6, 2016

(54) CAMERA MODULE HAVING A MOVING FRAME

(71) Applicant: SAMSUNG ELECTRONICS CO., LTD., Suwon-si, Gyeonggi-do (KR)

(72) Inventors: Young-jae Hwang, Suwon-si (KR); Kwang-seok Byon, Yongin-si (KR); Seung-hwan Lee, Suwon-si (KR); Bong-su Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 14/182,544

(22) Filed: Feb. 18, 2014

(65) Prior Publication Data
US 2015/0049209 A1    Feb. 19, 2015

(30) Foreign Application Priority Data

Aug. 19, 2013 (KR) .................. 10-2013-0098132

(51) Int. Cl.
  H04N 5/228 (2006.01)
  H04N 5/232 (2006.01)
  G02B 7/09 (2006.01)
  H04N 5/225 (2006.01)

(52) U.S. Cl.
  CPC ............ *H04N 5/23287* (2013.01); *G02B 7/09* (2013.01); *H04N 5/2257* (2013.01)

(58) Field of Classification Search
  CPC .......... H04N 5/23287; H04N 5/2254; H04N 5/2257; H04N 5/23248; H04N 5/23264; H04N 5/2253; H04N 5/23258; H04N 5/2328; H04N 5/335; G02B 27/646; G02B 27/642
  USPC .......................................... 348/208.1–208.99
  See application file for complete search history.

(56) References Cited

U.S. PATENT DOCUMENTS

| 8,818,181 | B1 | 8/2014 | Hwang et al. |
| 2005/0174465 | A1 | 8/2005 | Akada |
| 2005/0185531 | A1* | 8/2005 | Jang ............... G11B 7/0933 369/44.22 |
| 2006/0257129 | A1* | 11/2006 | Shibatani .................. 396/55 |
| 2007/0133967 | A1* | 6/2007 | Takahashi et al. ........... 396/55 |

(Continued)

FOREIGN PATENT DOCUMENTS

| JP | 2004-163748 A | 6/2004 |
| JP | 2006-184544 A | 7/2006 |
| KR | 10-2012-0067653 A | 6/2012 |

OTHER PUBLICATIONS

PCT Search Report and Written Opinion issued for PCT/KR2014/007209 (Nov. 19, 2014).

(Continued)

*Primary Examiner* — Chia-Wei A Chen
(74) *Attorney, Agent, or Firm* — Drinker Biddle & Reath LLP

(57) ABSTRACT

A camera module includes a lens barrel including at least one lens group; a moving frame that includes the lens barrel and moves in an optical axis direction and in a first direction and a second direction that are perpendicular to the optical axis direction; a fixed frame that movably supports the moving frame and provides the moving frame with a driving force in the optical axis direction, a driving force in the first direction, and a driving force in the second direction; and a base that fixes the fixed frame and includes an image sensor that is spaced apart from the at least one lens group in the optical axis direction.

27 Claims, 12 Drawing Sheets

(56) References Cited

U.S. PATENT DOCUMENTS

| | | |
|---|---|---|
| 2010/0091120 A1 | 4/2010 | Nagata et al. |
| 2010/0134902 A1* | 6/2010 | Naitou ............... 359/696 |
| 2011/0096178 A1 | 4/2011 | Ryu et al. |
| 2011/0217029 A1 | 9/2011 | Wu et al. |
| 2011/0236008 A1 | 9/2011 | Kang et al. |
| 2012/0082442 A1 | 4/2012 | Kwon et al. |
| 2012/0105960 A1* | 5/2012 | Park et al. ........... 359/554 |
| 2012/0147258 A1 | 6/2012 | Park |
| 2012/0229926 A1* | 9/2012 | Wade et al. ......... 359/824 |
| 2013/0016427 A1* | 1/2013 | Sugawara ............ 359/557 |
| 2013/0027790 A1* | 1/2013 | Park et al. ........... 359/824 |
| 2013/0162849 A1* | 6/2013 | Wu ..................... H04N 5/225 348/208.4 |
| 2013/0170039 A1* | 7/2013 | Miyoshi ............... 359/554 |
| 2013/0177301 A1* | 7/2013 | Nakayama et al. ..... 396/55 |
| 2013/0201559 A1* | 8/2013 | Minamisawa et al. ... 359/557 |
| 2013/0258172 A1* | 10/2013 | Seol et al. ........... 348/357 |
| 2013/0265394 A1 | 10/2013 | Lim |
| 2015/0207968 A1* | 7/2015 | Yeo ..................... G03B 5/00 348/374 |
| 2015/0229843 A1* | 8/2015 | Shimizu ............... 348/222.1 |
| 2015/0370086 A1* | 12/2015 | Hamada .............. G03B 5/00 359/557 |

OTHER PUBLICATIONS

European Search Report issued for related application EP 14158883.0, Aug. 17, 2015, 3 pages.

* cited by examiner

CAMERA MODULE HAVING A MOVING FRAME

CROSS REFERENCE TO RELATED APPLICATIONS

This application claims the benefit of Korean Patent Application No. 10-2013-0098132, filed on Aug. 19, 2013, in the Korean Intellectual Property Office, the disclosure of which is incorporated herein in its entirety by reference.

This application is also related to an application being filed concurrently herewith, identified by Ser. No. 14/182,489, entitled "Camera Module, and Position Detector and Position Detection Method Used in the Camera Module", and claiming the benefit of Korean Patent Application No. 10-2013-0098131, the disclosure of which is incorporated herein in its entirety by reference.

BACKGROUND

One or more embodiments relate to a camera module, and more particularly, to a camera module capable of performing Auto Focus (AF) and optical image stabilization (OIS).

A digital camera is a device capable of storing an image of a subject as a digital file including a picture or a video image. Examples of the digital camera include a digital still camera (DSC), a digital video camera (DVC), and a digital camera module mounted in a mobile phone.

Consumers' demand for high-quality still images and/or videos has considerably increased along with the use of digital photographing apparatuses such as DSCs and/or DVCs. In particular, the demand for a camera module having an Auto Focus (AF) function for automatically adjusting a focus and an optical image stabilization (OIS) function for preventing a decrease in image sharpness due to user' handshaking has increased.

Such a camera module may include a single-axis driving unit that moves a lens barrel along an optical axis to perform an Auto Focus function and a two-axis driving unit that moves the lens barrel in a direction perpendicular to the optical axis. In other words, the camera module may include driving units for moving the lens barrel along three axes. For this purpose, a printed circuit board is used to supply current from the outside to the driving units.

When at least one of the driving units connected to the printed circuit board is moved together with the lens barrel, the printed circuit board connected to the moving driving unit is folded or unfolded. In this process, a predetermined tension variation may be generated in the printed circuit board. In particular, as the size of the camera module has become compact, the variation in tension may obstruct movement of the driving unit connected to the printed circuit board, deteriorating quality of the camera module.

SUMMARY

One or more embodiments disclosed herein include a camera module capable of performing an Auto Focus (AF) function and an Optical Image Stabilization (OIS) function, whereby a lens may be precisely moved, and capable of reducing or preventing a variation in a tension of a printed circuit board.

Additional aspects will be set forth in part in the description which follows and, in part, will be apparent from the description, or may be learned by practice of the presented embodiments.

According to one or more embodiments, a camera module includes: a lens barrel including at least one lens group; a moving frame that mounts the lens barrel and moves in an optical axis direction, and in a first direction and a second direction that are perpendicular to the optical axis direction; a fixed frame that movably supports the moving frame and provides the moving frame with a driving force in the optical axis direction, a driving force in the first direction, and a driving force in the second direction; and a base that fixes the fixed frame and includes an image sensor that is spaced apart from the at least one lens group in the optical axis direction.

The fixed frame may include a first driving coil for moving the moving frame in the optical axis direction, a second driving coil for moving the moving frame in the first direction, and third driving coils for moving the moving frame in the second direction, wherein the moving frame includes first, second, and third magnets respectively corresponding to the first, second, and third driving coils.

The camera module may further include a printed circuit board that is electrically connected to the fixed frame.

The printed circuit board may supply a current to the first, second, and third driving coils to move the moving frame.

Tension of the printed circuit board may remain constant while the moving frame moves.

The first, second, and third driving coils may be respectively spaced apart from the first, second, and third magnets in a direction perpendicular to the optical axis direction.

The first, second, and third driving coils may be disposed in sidewalls of the fixed frame.

The fixed frame may include a hole into which at least one of the first, second, and third driving coils is inserted.

The moving frame may include a groove portion into which at least one of the first, second, and third magnets is inserted.

The moving frame may include: a first moving frame that is movably supported by the fixed frame in the optical axis direction; and a second moving frame that is movably supported by the first moving frame in the first and second directions.

A plurality of ball bearings may be disposed between the fixed frame and the first moving frame, wherein a guide groove that guides the plurality of ball bearings in the optical axis direction is formed in at least one of the fixed frame and the first moving frame.

A plurality of ball bearings may be disposed between the first moving frame and the second moving frame, wherein a guide groove that guides the plurality of ball bearings in the first direction or the second direction is formed in at least one of the first moving frame and the second moving frame.

The second moving frame may include: a first sub-moving frame that is moved in the first direction, wherein the second magnet is disposed at a side of the first sub-moving frame; and a second sub-moving frame that is moved in the second direction, wherein the third magnets are disposed at two sides of the second sub-moving frame.

The second sub-moving frame may be movably supported by the first sub-moving frame in the second direction, and the first sub-moving frame may be movably supported by the first moving frame in the first direction.

A plurality of ball bearings may be disposed between the first sub-moving frame and the second sub-moving frame, wherein a guide groove that guides the plurality of ball bearings in the second axis direction is formed in at least one of the first sub-moving frame and the second sub-moving frame.

A plurality of ball bearings may be disposed between the first sub-moving frame and the first moving frame, wherein a guide groove that guides the plurality of ball bearings in the first direction is formed in at least one of the first sub-moving frame and the first moving frame.

The first sub-moving frame may include a detour portion to make a detour with respect to the third magnets. The detour portion and the third magnets may be spaced apart from each other.

The first moving frame may include a yoke that is disposed to correspond to the third magnets in order to prevent the second moving frame from detaching therefrom.

The fixed frame may include first, second, and third sensors that correspond to the first, second, and third magnets, respectively.

The first, second, and third sensors may be magnetic sensors.

The first sensor may detect a position of the first magnet in the optical axis direction.

The second sensor may detect a position of the second magnet in the first direction.

The third sensors may detect a position of the third magnets in the second direction.

The third magnets may be disposed at two sides in the first direction of the second moving frame, wherein the third sensors are disposed at two sides in the first direction of the fixed frame.

A position of the moving frame in the second direction may be detected based on a first detection signal detected by one of the third sensors and a second detection signal detected by other of the third sensors.

A position of the moving frame in the second direction may be detected based on a third detection signal which is a sum of the first detection signal and the second detection signal.

A sum of a distance between one of the third sensors and one of the third magnets in the first direction and a distance between the other of the third sensors and the other of the third magnets may be constant.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
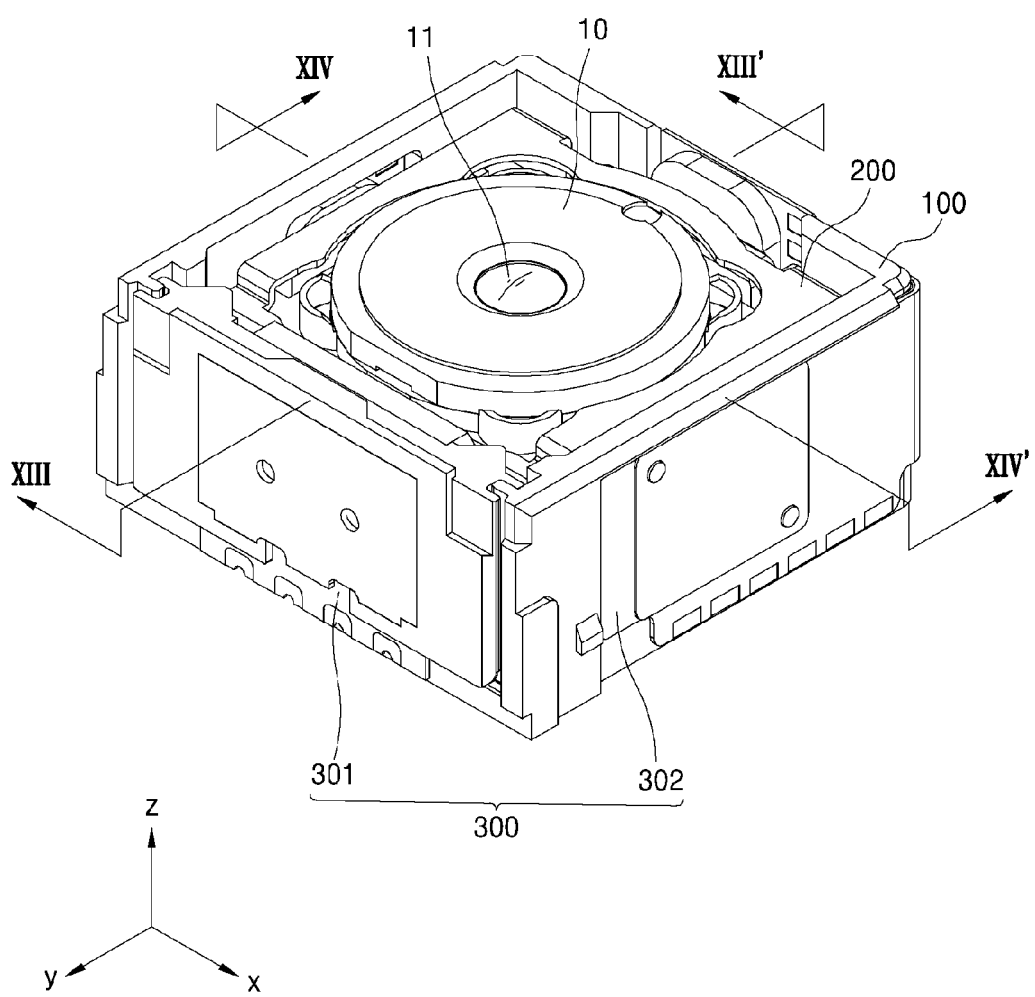
FIG. 1 is an assembled perspective view of a camera module according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first", "second", "third" etc. may be used herein to describe various elements, these elements should not be limited by these terms. These terms are only used to distinguish one element from another.

FIG. 1 is an assembly view of a camera module according to an embodiment.

Referring to FIG. 1, the camera module may include a lens barrel 10 including at least one lens group 11, a moving frame 200 that mounts (or includes) the lens barrel 10 to move the lens barrel 10 in an optical axis direction (z-axis direction) and in first and second directions (x-axis and y-axis directions) that are perpendicular to the optical axis direction (z-axis), a fixed frame 100 that movably supports the moving frame 200, and a print circuit board 300 that supplies a current to move the moving frame 200. The second direction (y-axis direction) may be orthogonal to the first direction (x-axis direction), but is not limited thereto.

The moving frame 200 may be driven along the optical axis direction (z-axis direction), the first direction (x-axis direction), and the second direction (y-axis direction). Accordingly, an Auto Focus (AF) function of automatically adjusting a focus on an image sensor 21 (see FIG. 11) and an optical image stabilizer (OIS) function of preventing a decrease in an image quality due to vibration such as hand shaking may be performed. The moving frame 200 performs the Auto Focus function by moving the lens barrel 10 along the optical axis direction (z-axis direction), and also perform the OIS function by moving the lens barrel 10 two-dimensionally along directions (x-axis direction and y-axis direction) that are perpendicular to the optical axis direction (z-axis).

The printed circuit board 300 provides the fixed frame 100 with a current for three-axis driving of the moving frame 200. The printed circuit board 300 may drive the moving frame 200 along three axes by providing a current to the fixed frame 100. The printed circuit board 300 may be a flexible printed circuit board.

If the printed circuit board 300 provides a current to the moving frame 200 and not to the fixed frame 100, the printed circuit board 300 may be folded or unfolded while the moving frame 200 is moved. Accordingly, the printed circuit board 300 may be damaged or a tension applied to the printed circuit board 300 may vary. The tension variation may hinder an accurate movement of the moving frame 200.

However, according to the current embodiment, the printed circuit board 300 provides a current not to the moving frame 200 but to the fixed frame 100, thereby preventing folding or unfolding of the printed circuit board 300 due to movement of the moving frame 200. As there is no tension variation in the printed circuit board 300, the moving frame 200 may be accurately moved. Hereinafter, a structure in which an electrical connection is provided not to the moving frame 200 but to the fixed frame 100 via the printed circuit board 300 of the camera module will be described in detail.

Figure 2:
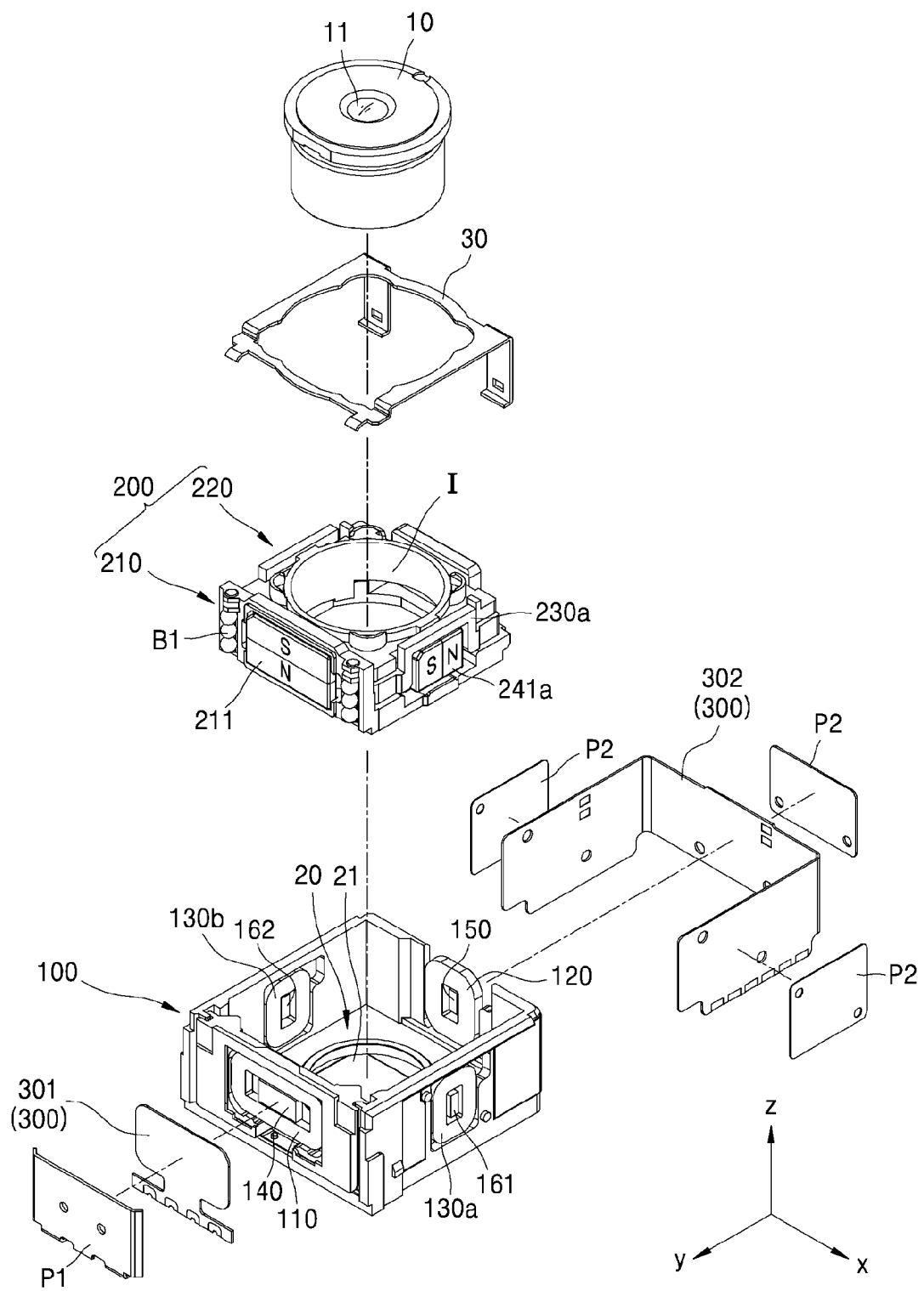
FIG. 2 is an exploded perspective view illustrating the camera module of FIG. 1 according to an embodiment.
Figure 3:
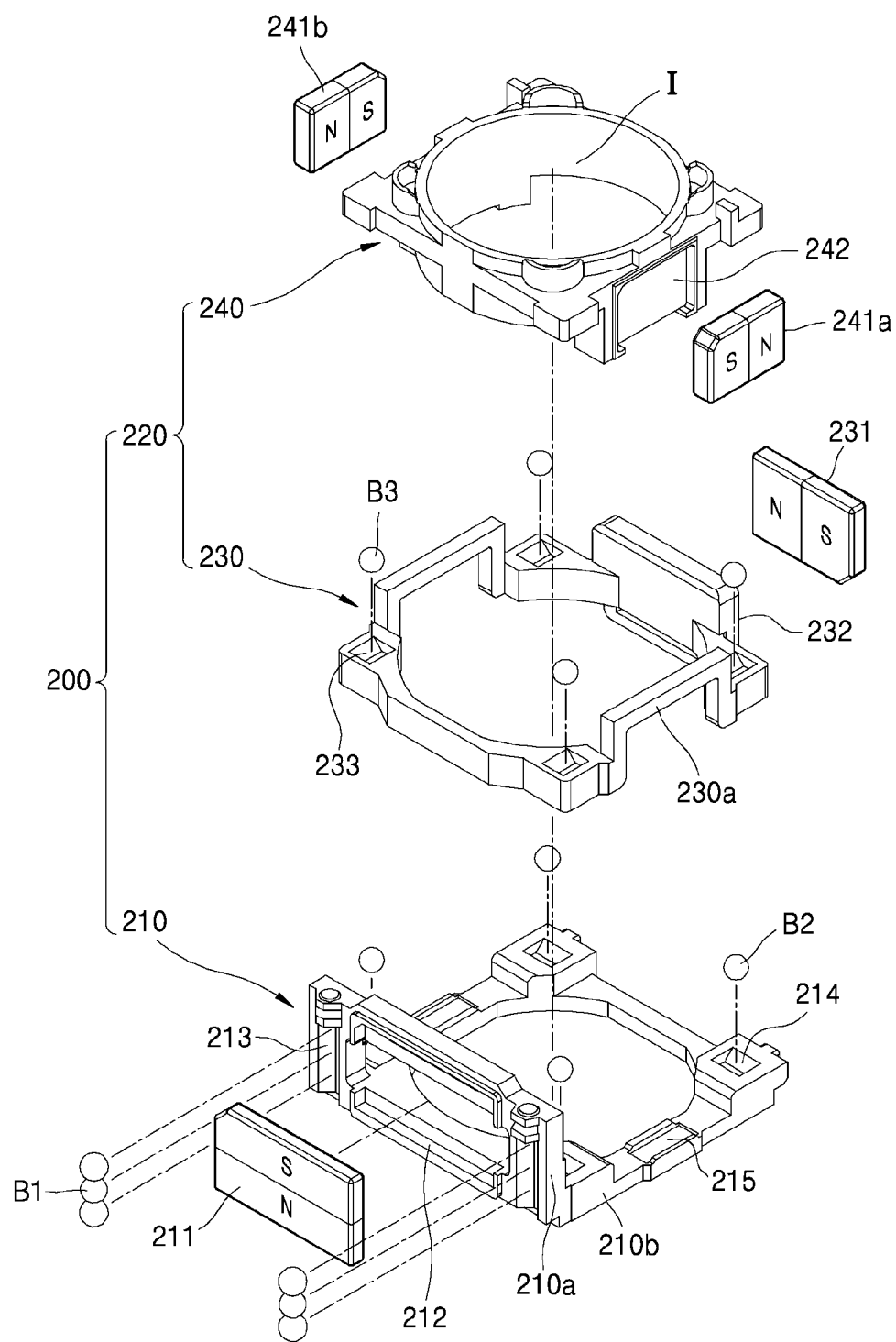
FIG. 3 is an exploded perspective view of a moving frame of FIG. 2, according to an embodiment.
Figure 4:
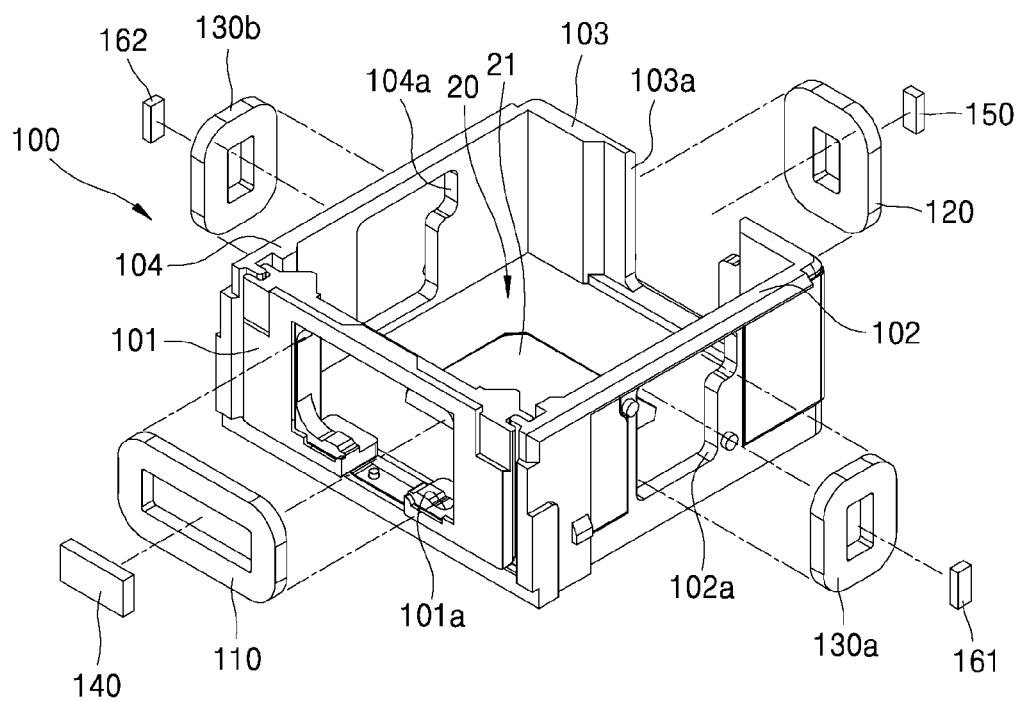
FIG. 4 is an exploded perspective view of a fixed frame of FIG. 2, according to an embodiment.

FIG. 2 is an exploded perspective view illustrating the camera module of FIG. 1. FIG. 3 is an exploded perspective view of the moving frame 200 of FIG. 2, according to an embodiment. FIG. 4 is an exploded perspective view of the fixed frame 100 of FIG. 2, according to an embodiment.

Referring to FIGS. 2 through 4, the camera module includes a base 20, the fixed frame 100 fixed to the base 20, a first moving frame 210 that is movably supported by the fixed frame 100 in an optical axis direction (z-axis direction), a second moving frame 220 that is movably supported by the first moving frame 210 in a direction perpendicular to the optical axis direction, a cover 30 covering an upper portion of the second moving frame 220, and a printed circuit board 300 that is disposed at a side portion of the fixed frame 100.

The base 20 is disposed under the fixed frame 100, and an image sensor 21 may be included in a central portion of the base 20. The lens barrel 10 may be spaced apart from the image sensor 21 in the optical axis direction (z-axis direction).

The fixed frame 100 is fixed to the base 20. As the fixed frame 100 is fixed to the base 20, relative positions of the fixed frame 100 and the base 20 do not vary with respect to each other. Also, the fixed frame 100 may be directly fixed to the base 20 as illustrated in FIGS. 2 through 4, or the fixed frame 100 may be indirectly fixed to the base 20 via another member.

The fixed frame 100 movably supports the moving frame 200, and provides a driving force to the moving frame 200 in the optical axis direction (z-axis direction) and in a first direction (x-axis direction) and a second direction (y-axis direction).

The fixed frame 100 may include first through fourth sidewalls 101, 102, 103, and 104 that surround side portions of the moving frame 200. The four sidewalls 101, 102, 103, and 104 of the fixed frame 100 respectively include first and second driving coils 110 and 120 and third driving coils 130a and 130b For example, the first driving coil 110 for moving the first moving frame 210 in the optical axis direction (z-axis direction) is included in a hole 101a of the first sidewall 101, the second driving coil 120 for moving the second moving frame 220 in the first direction (x-axis direction) is included in a hole 103a of the third sidewall 103, and the third driving coils 130a and 130b for moving the second moving frame 220 in the second direction (y-axis direction) are included in holes 102a and 104a of the second and fourth sidewalls 102 and 104. By including the third driving coils 130a and 130b in the second and fourth sidewalls 102 and 104, the second moving frame 220 may be stably moved in the second direction (y-axis direction). The first and second driving coils 110 and 120 and the third driving coils 130a and 130b receive a current from the printed circuit board 300 to move the first and second moving frames 210 and 220. The first and second moving frames 210 and 220 are disposed inside the fixed frame 100.

The first moving frame 210 is moved in the fixed frame 100 in the optical axis direction (z-axis direction). A first magnet 211 may be disposed in the first moving frame 210 to correspond to the first driving coil 110. The first magnet 211 includes an N-pole and an S-pole arranged along the optical axis direction (z-axis direction). The first magnet 211 may be a permanent magnet that generates a magnetic force without use of an additional power supply.

The first moving frame 210 may be movably supported by the fixed frame 100 in the optical axis direction (z-axis direction). A plurality of ball bearings B1 may be arranged between the first moving frame 210 and the fixed frame 100. A guide groove 213 that guides the ball bearings B1 to be moved along the optical axis direction (z-axis direction) may be formed in at least one of the first moving frame 210 and the fixed frame 100. The guide groove 213 is extended in the optical axis direction (z-axis direction), and may be used to remove a force that is applied to the ball bearings B1 in another direction different from the optical axis direction (z-axis direction). Accordingly, the first moving frame 210 may be moved accurately in the optical axis direction (z-axis direction).

The first moving frame 210 may have an L-shaped cross-section. The first moving frame 210 includes a first region 210a that is parallel to the optical axis direction (z-axis direction) and a second region 210b that is perpendicular to the optical axis direction (z-axis direction). The first magnet 211 and a groove portion 212 into which the first magnet 211 is to be inserted may be formed in the first region 210a. A second region 210b movably supports the second moving frame 220 in a direction perpendicular to an optical axis. In the second region 210b, a yoke 215 for preventing detachment of the second moving frame 220 therefrom may be included.

The second moving frame 220 is moved in a direction perpendicular to the optical axis in the fixed frame 100. For example, the second moving frame 220 may be movably supported in the first moving frame 210 in a direction perpendicular to the optical axis. The second moving frame 220 may include a mounting portion I in which the lens barrel 10 may be mounted and second magnets 231 and third magnets 241a and 241b disposed around a circumference of the mounting portion I to respectively correspond to the second driving coils 120 and the third driving coils 130a, and 130b. The second magnet 231 includes an N-pole and an S-pole arranged in the first direction (x-axis direction) perpendicular to the optical axis. The third magnets 241a and 241b each include an N-pole and an S-pole arranged in the second direction (y-axis direction) perpendicular to the optical axis. The arrangement directions of the N-pole and the S-pole of the second magnets 231 and the third magnets 241a and 241b may be perpendicular to the arrangement direction of the N-pole and the S-pole of the first magnet 211. According to this arrangement, the first and second magnets 211 and 231 and the third magnets 241a and 241b may be disposed at a side portion of the moving frame 200, and may move the first and second moving frames 210 and 220 along three axes. The second magnet 231 and the third magnets 241a and 241b may each be a permanent magnet that generates a magnetic force without use of an additional power supply.

The second moving frame 220 may include a first sub-moving frame 230 and a second sub-moving frame 240. The first sub-moving frame 230 may be movably supported by the first moving frame 210 in the first direction (x-axis direction). A plurality of ball bearings B2 may be disposed between the first sub-moving frame 230 and the first moving frame 210. A guide groove 214 that guides the ball bearings B2 to move in the first direction (x-direction) may be formed in at least one of the first sub-moving frame 230 and the first moving frame 210. The guide groove 214 is extended in the first direction (x-axis direction), and may remove a force that is applied to the ball bearings B1 in another direction different from the first direction (x-direction). Accordingly, the first sub-moving frame 230 may be accurately moved along the first direction (x-direction). A groove portion 232 into which the second magnet 231 is inserted is formed in the first sub-moving frame 230, and a detour portion 230a that prevents interference of the first sub-moving frame 230 with the third magnets 241a and 241b may also be formed in the first sub-moving frame 230. When the third magnets 241a and 241b are moved in the second direction (Y-axis direction), the detour portion 230a may be spaced apart from the third magnets 241a and 241b to not obstruct movement of the third magnets 241a and 241b. For example, if the third magnets 241a and 241b are set to move about 0.2 mm in the second direction (y-axis direction), a distance between the detour portion 230a and the third magnets 241a and 241b may be about 0.4 mm.

The second sub-moving frame 240 may be movably supported by the first sub-moving frame 230 in the second direction (y-axis direction). A plurality of ball bearings B3 may be disposed between the second sub-moving frame 240 and the first sub-moving frame 230. A guide groove 233 that guides the ball bearings B3 to move in the second direction (y-axis direction) may be formed in at least one of the second sub-moving frame 240 and the first sub-moving frame 230. The guide groove 233 is extended in the second direction (y-axis direction), and may remove a force that is applied to the ball bearings B1 in another direction different from the second direction (y-axis direction). Accordingly, the second sub-moving frame 240 may be accurately moved in the second direction (y-axis direction). A groove portion 242 into which the third magnets 241a and 241b are to be inserted may be formed in the second sub-moving frame 240.

The fixed frame 100 is electrically connected to the printed circuit board 300. Accordingly, the first, second, and third driving coils 110, 120, 130a, and 130b included in the fixed frame 100 receive a current to move the first and second moving frames 210 and 220.

When a current is supplied to the first and second coils 110 and 120 and the third driving coils 130a, 130b, the first and second magnets 211 and 231 and third magnets 241a and 241b corresponding thereto move in a predetermined direction according to the Fleming left hand rule. When a current is supplied to the first driving coil 110, the first magnet 211 is moved in the optical axis direction (z-axis direction). The first magnet 211 may be moved in a positive direction or a negative direction of the optical axis direction (z-axis direction) according to a direction that the current is supplied to the first driving coil 110. When a current is supplied to the second driving coil 120, the second magnet 231 is moved in a positive direction or a negative direction of the first direction (x-axis direction) that is perpendicular to the optical axis. When a current is supplied to the third driving coils 130a and 130b, the third magnets 241a and 241b are also moved in a positive direction or a negative direction of the second direction (y-axis direction) that is perpendicular to the optical axis.

The printed circuit board 300 is electrically connected to the fixed frame 100. For example, a first printed circuit board 301 is connected to the first driving coil 110, and a second printed circuit board 302 is connected to second driving coil 120 and the third driving coils 130a and 130b. First and second plates P1 and P2 for connecting the printed circuit board 300 to the first and second driving coils 110 and 120 and the third driving coils 130a and 130b may be disposed outside the printed circuit board 300. The first plate P1 may be disposed on the outside of the first printed circuit board 301, and the second plate P2 may be disposed on the outside of the second printed circuit board 302. The first and second plates P1 and P2 may be formed of various materials such as stainless steel.

As described above, by disposing the first and second magnets 211 and 231 and the third magnets 241a and 241b which are not needed to be electrically connected, to the moving frame 200 that is moved along three axes and disposing the first and second driving coils 110 and 120 and the third driving 130a and 130b which are needed to be electrically connected, to the fixed frame 100 fixed to the base 20, the printed circuit board 300 that is electrically connected to the fixed frame 100 does not interfere with a movement of the moving frame 200. Accordingly, the moving frame 200 may be moved accurately.

First and second sensors 140 and 150 and third sensors 161 and 162 that sense a movement of the moving frame 200 may be included in the first through fourth sidewalls 101, 102, 103, and 104 of the fixed frame 100. For example, the first sensor 140 is included in the first sidewall 101 to sense a movement of the first magnet 211 in the optical direction (z-axis direction) and the second sensor 150 is included in the third sidewall 103 to sense a movement of the second magnet 231 in the first direction (x-axis direction), and the third sensors 161 and 162 may be included in the second and fourth sidewalls 102 and 104 to sense a movement of the third magnets 241a and 241b in the second direction (y-axis direction).

The first and second sensors 140 and 150 and the third sensors 161 and 162 may be magnetic sensors that may output an electrical signal in proportion to a magnetic field of a magnet by using a Hall effect, thereby sensing a movement of the first and second magnets 211 and 231 and the third magnets 241a and 241b and the moving frame 200 in which the first and second magnets 211 and 231 and the third magnets 241a and 241b are installed.

The first and second sensors 140 and 150 and the third sensors 161 and 162 may detect positions of the first and second magnets 211 and 231 and the third magnets 241a and 241b used in moving the moving frame 200. Accordingly, there is no need to install an additional magnet for position detection, and thus, a structure of the camera module may be simplified.

Figure 5:
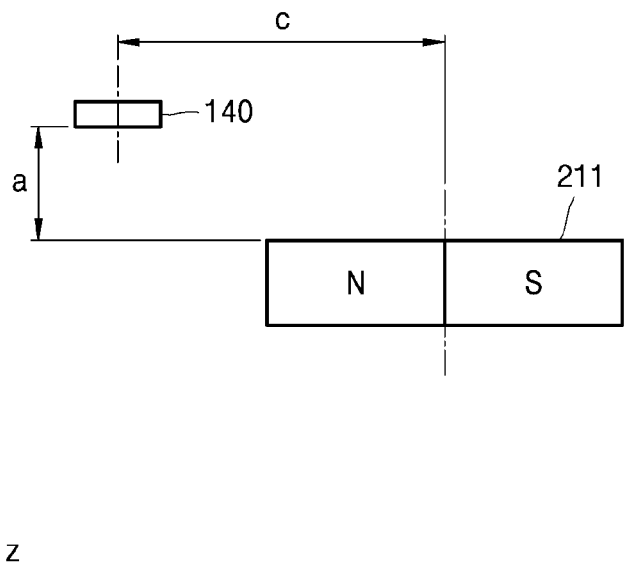
FIG. 5 is a conceptual block diagram illustrating a first magnet and a first sensor, according to an embodiment.

The first sensor 140 may determine position movement of the first magnet 211 in the optical axis direction (z-axis direction). FIG. 5 is a conceptual block diagram illustrating a first magnet and a first sensor, according to an embodiment. The principle of detecting a position of the first magnet 211 via the first sensor 140 will be briefly described with reference to FIG. 5.

Figure 6:
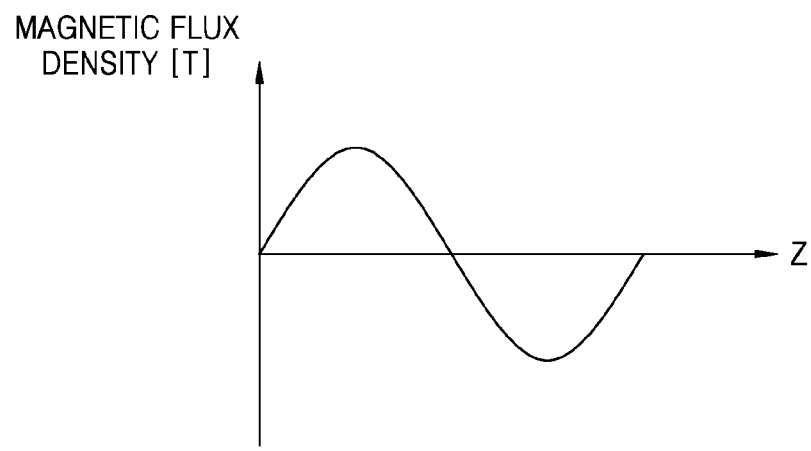
FIG. 6 is a graph showing a magnetic flux density of a first magnet in an optical axis direction, according to an embodiment.

The first magnet 211 may be moved in the optical axis direction (z-axis direction). As the first magnet 211 is moved in the optical axis direction (z-axis direction), a distance c between a center of the first magnet 211 and a center of the first sensor 140 in the optical axis direction (z-axis direction) may vary. The first magnet 211 has an N-pole and an S pole arranged in the optical axis direction (z-axis direction), and thus, the first magnet 211 may have a predetermined magnetic flux density in the optical axis direction (z-axis direction) as shown in FIG. 6. As the first magnet 211 is moved in the optical axis direction (z-axis direction) with respect to the first sensor 140, a detection signal detected by the first sensor 140, for example, a magnetic flux density, varies.

Figure 7:
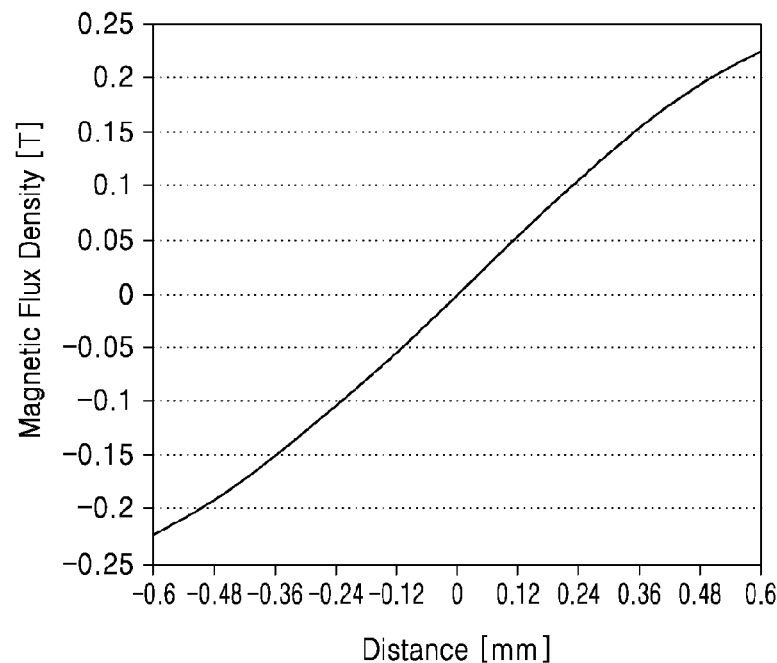
FIG. 7 is a graph showing a magnetic flux density detected as a first magnet is moved in an optical axis direction while the first magnet and a first sensor are spaced apart from each other in a second direction by a distance of 0.6 mm, according to an embodiment.

FIG. 7 is a graph showing a magnetic flux density detected by the first sensor 140 while the first magnet 211 that is spaced apart from the first sensor 140 by a predetermined distance a, for example, 0.6 mm, in the second direction (y-axis direction), and is moved in the optical axis direction (z-axis direction). Referring to FIG. 7, a first magnetic flux density detected by using the first magnetic sensor 211 has a predetermined value according to the distance c between the center of the first magnet 211 and the center of the first sensor 140 in the optical axis direction (z-axis direction). For example, if the distance c between the center of the first magnet 211 and the center of the first sensor 140 along the optical axis direction (z-axis direction) is 0, a first magnetic density detected by the first sensor 140 is 0 T(tesla), and if the distance c between the center of the first magnet 211 and the center of the first sensor 140 along the optical axis direction (z-axis direction) is 0.12 mm, a first magnetic density detected by the first sensor 140 may be 0.05 T. On the other hand, if the distance c between the center of the first magnet 211 and the center of the first sensor 140 along the optical axis direction (z-axis direction) is −0.12 mm, the first magnetic density detected by the first sensor 140 may be −0.05 T. That is, the first magnetic flux density detected by the first sensor 140 may be determined according to a position of the first magnet 211 along the optical axis direction (z-axis direction). Thus, a position of the first magnet 211 along the optical axis direction (z-axis direction) may be determined based on the first magnetic flux density detected by the first sensor 140.

In the above description about the determination of a position of the first magnet 211 along the optical axis direction (z-axis direction), it is assumed that the distance a between the first magnet 211 and the first sensor 140 along the second direction (y-axis direction) is constant. Referring to FIGS. 2 through 4 again, the first moving frame 210 in which the first magnet 211 is included is moved only in the optical axis direction (z-axis direction) with respect to the fixed frame 100, in which the first sensor 140 is included, via the guide groove 213, and thus, the distance a between the first magnet 211 and the first sensor 140 in the second direction (y-axis direction) is constant. A position movement of the first magnet 211 in the optical axis direction (z-axis direction) may be determined based on a magnetic flux density detected by the first sensor 140 which is spaced apart from the first magnet 211 in the second direction (y-axis direction) by a constant distance. Accordingly, the first sensor 140 may determine a position movement of the first moving frame 210, in which the first magnet 211 is included, in the optical axis direction (z-axis direction).

The second sensor 150 may determine a position movement of the second magnet 231 in the first direction (x-axis direction). The first sub-moving frame 230 in which the second magnet 231 is included is moved in the first direction (x-axis direction) with respect to the first moving frame 210 via the guide groove 214. The first sub-moving frame 210 is not capable of moving in the second direction (y-axis direction) with respect to the first moving frame 210, and thus, a distance between the second sensor 150 installed in the fixed frame 100 and the second magnet 231 included in the first sub-moving frame 230 in the second direction (y-axis direction) is constant. The same as above, a position movement of the second magnet 231 in the first direction (x-axis direction) may be determined based on a magnetic flux density detected by the second sensor 150 which is spaced apart from the second magnet 231 by a constant distance in the second direction (y-axis direction). Accordingly, the second sensor 150 may determine a position of the first sub-moving frame 230 in which the second magnet 231 is included.

The third sensors 161 and 162 may determine a position movement of the pair of third magnets 241a and 241b in the second direction (y-axis direction). The second sub-moving frame 240 in which the third magnets 241a and 241b are included is moved in the second direction (y-axis direction) with respect to the first sub-moving frame 230 via the guide groove 233. The second sub-moving frame 240 is not capable of moving in the first direction (x-axis direction) with respect to the first sub-moving frame 230, but the first sub-moving frame 230 which movably supports the second sub-moving frame 240 may be moved in the first direction (x-axis direction) as described above. Accordingly, when the first sub-moving frame 230 is moved in the first direction (x-axis direction), the second sub-moving frame 240 is moved in the first direction, and consequently, the third magnets 241a and 241b are moved in the first direction (x-axis direction). Accordingly, the distance between the third magnet 241a the third sensor 161 and the distance between the third magnet 241b and the third sensor 162 varies.

Figure 8:
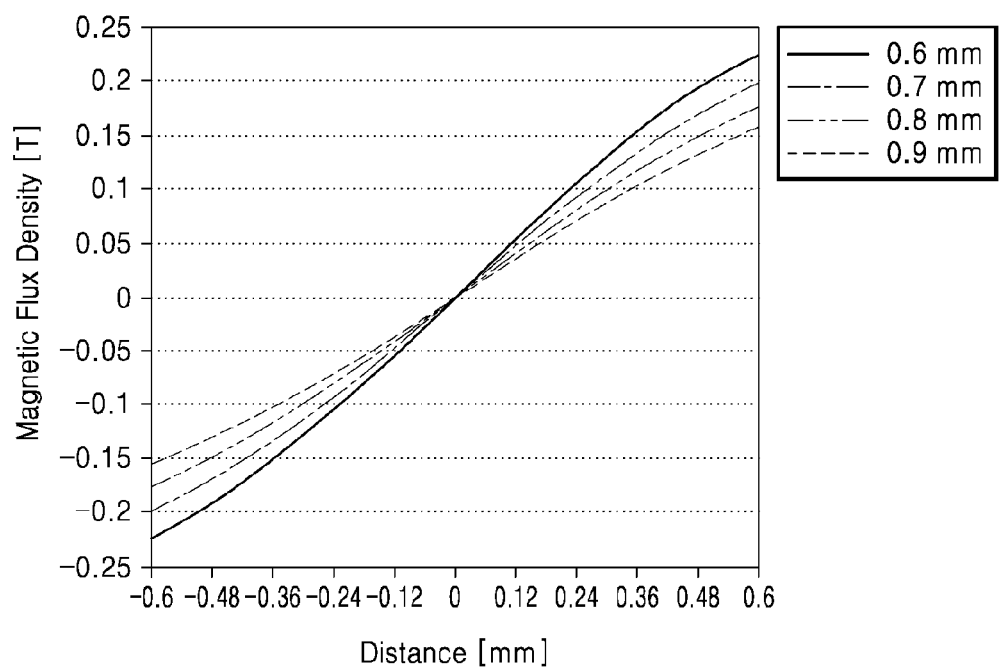
FIG. 8 is a graph showing a magnetic flux density detected by a third magnetic sensor as the third magnet is moved in the second direction, when a distance between the third magnet and the third sensor is varied in the first direction, according to an embodiment.

FIG. 8 is a graph showing a magnetic flux density detected by the third magnetic sensor 161 as the third magnet 241a is moved in the second direction (y-axis direction), when the distance a between the third magnet 241a and the third sensor 161 varies in the first direction (x-axis direction). Referring to FIG. 8, the magnetic flux density detected by the third sensor 161 as the third magnet 241a is moved along the second direction (y-axis direction) varies according to the distance between the third magnet 241a and the third sensor 161 along the first direction (x-axis direction). For example, when the distance between the third magnet 241a and the third sensor 161 in the first direction (x-axis direction) was 0.6 mm, 0.7 mm, 0.8 mm, and 0.9 mm, and the third magnet 241 has moved from the third sensor 161 by 0.6 mm in the second direction (y-axis direction), a magnetic density detected by using the third sensor 161 was about 0.225 T, about 0.2 T, about 0.175 T, and about 0.16 T, respectively. That is, even though the third magnet 241a is disposed at the same position along the second direction (y-axis direction), if the distance between the third magnet 241a and the third sensor 161 along the first direction (x-axis direction) varies, the magnetic flux density detected by the third sensor 161 is not constant. Accordingly, if a position of the third magnet 241a along the second direction (y-axis direction) is determined only by the magnetic flux density detected by the third sensor 161, a significant error may occur.

In view of this, according to the current embodiment, the third sensors 161 and 162 that are spaced apart from each other by a predetermined distance are disposed on two sides of the pair of third magnets 241a and 241b in the first direction (x-axis direction), and a position of the third magnets 241a and 241b in the second direction (y-axis direction) may be determined based on a magnetic flux density detected by the third sensors 161 and 162.

Figure 9:
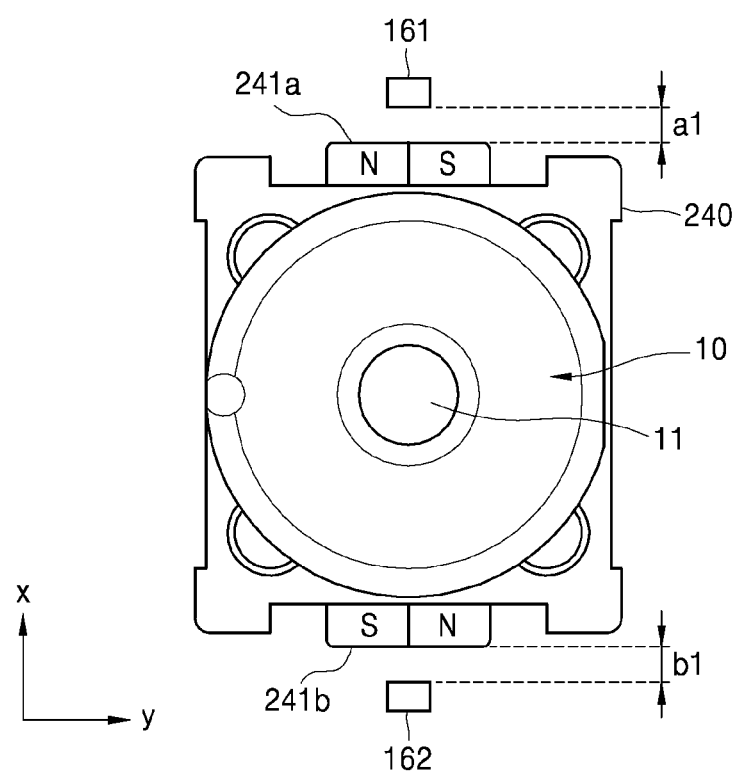
FIG. 9 is a plan view of the camera module of FIG. 2 illustrating a second sub-moving frame, according to an embodiment.
Figure 10A:
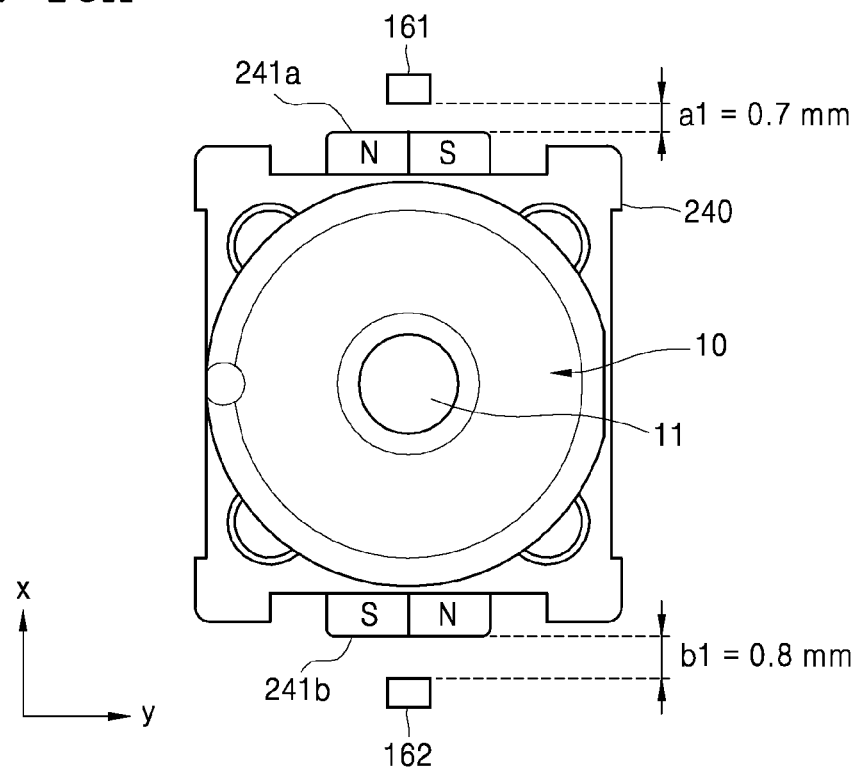
FIGS. 10A and 10B are plan views of the camera module illustrating a second sub-moving frame of FIG. 9 moved in a first direction, according to various embodiments.
Figure 10B:
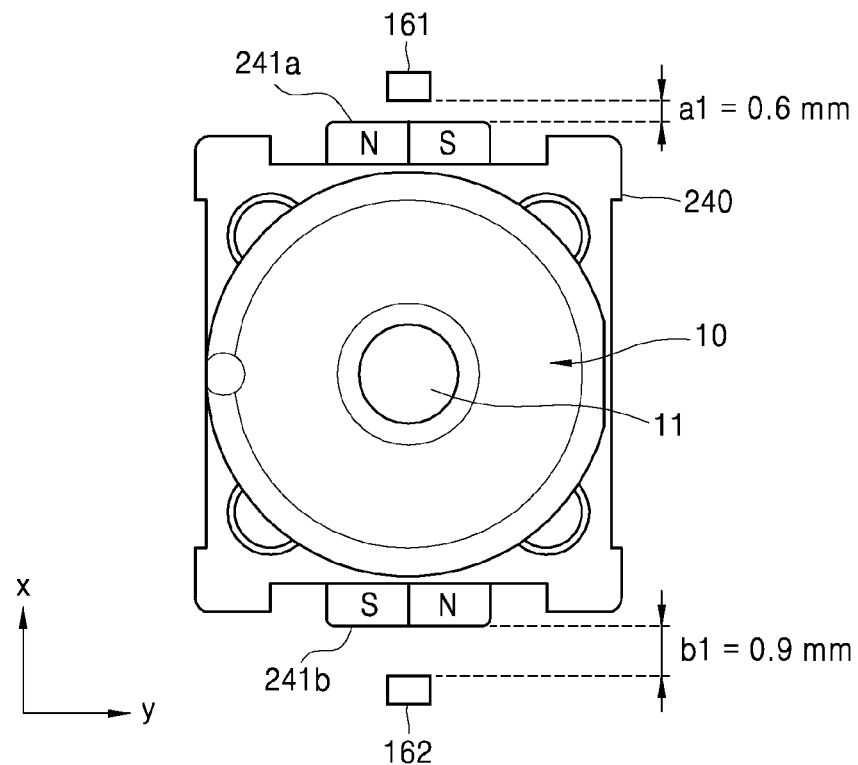

FIG. 9 is a plan view of the camera module of FIG. 2 illustrating the second sub-moving frame 240, according to an embodiment. FIGS. 10A and 10B are plan views that illustrate the second sub-moving frame 240 of FIG. 9 moved in the first direction (x-axis direction), according to embodiments.

Referring to FIG. 9, the second sub-moving frame 240 mounts the lens barrel 10 and is moved in the first direction and the second direction. The second sub-moving frame 240 includes third magnets 241a and 241b disposed at two sides in the first direction (x-axis direction). The fixed frame 100 includes third sensors 161 and 162 spaced apart from each other in the first direction (x-axis direction) to respectively correspond to the third magnets 241a and 241b. The third sensors 161 and 162 are spaced apart from each other by a predetermined distance. When a distance between the third magnet 241a and the third sensor 161 in the first direction (x-axis direction) is a1, and a distance between the other third magnet 241b and the other third sensor 162 in the first direction (x-axis direction) is b1, the distances a1 and b1 vary according to movement of the second sub-moving frame 240 in the first direction (x-axis direction). However, a sum of a1+b1 remains constant.

Referring to FIG. 10A, the second sub-moving frame 240 is moved in the first direction (x-axis direction) such that the third magnet 241a may be spaced apart from the third sensor 161 in the first direction (x-axis direction) by 0.7 mm, and the third magnet 241b may be spaced apart from the third sensor 162 in the first direction (x-axis direction) by 0.8 mm. Referring to FIG. 10B, the second sub-moving frame 240 is moved in the first direction (x-axis direction) such that the third magnet 241a may be spaced apart from the third sensor 161 in the first direction (x-axis direction) by 0.6 mm, and the third magnet 241b may be spaced apart from the third sensor 162 in the first direction (x-axis direction) by 0.9 mm.

Figure 11A:
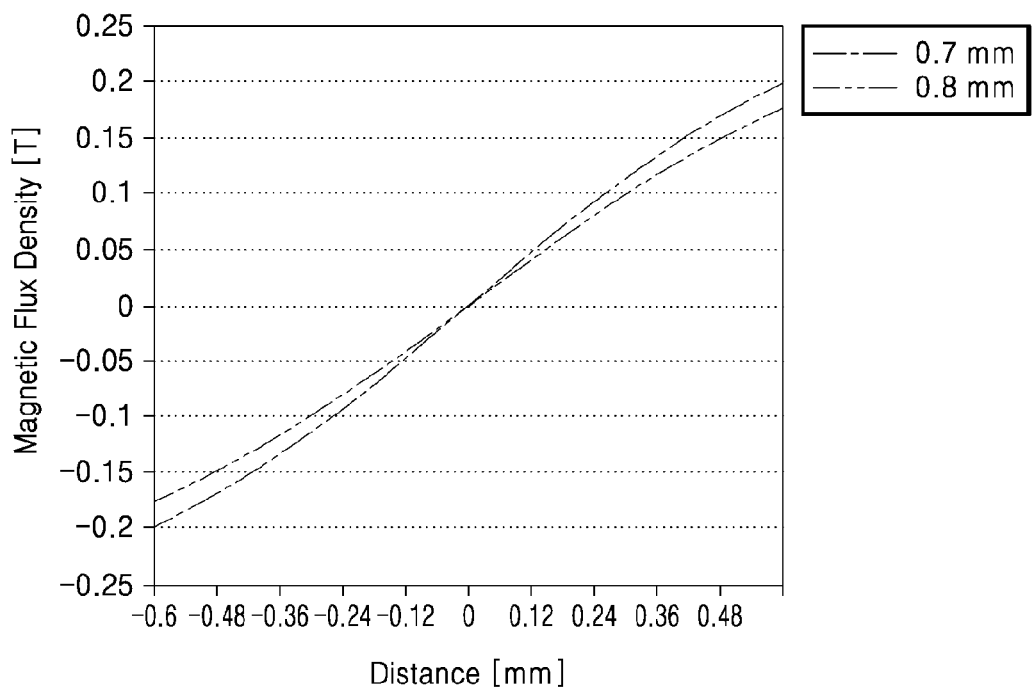
FIG. 11A is a graph showing a magnetic flux density detected by a third sensor of FIG. 10A according to a position of the third magnet in a second direction.
Figure 11B:
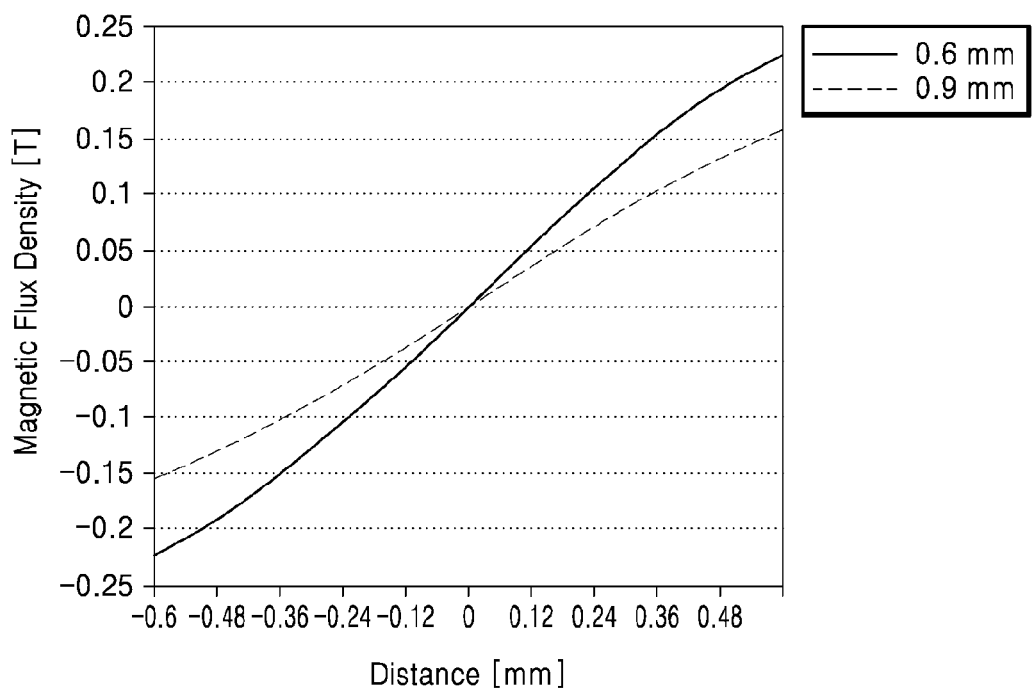
FIG. 11B is a graph showing a magnetic flux density detected by the third sensor of FIG. 10B according to a position of the third magnet in the second direction.
Figure 12:
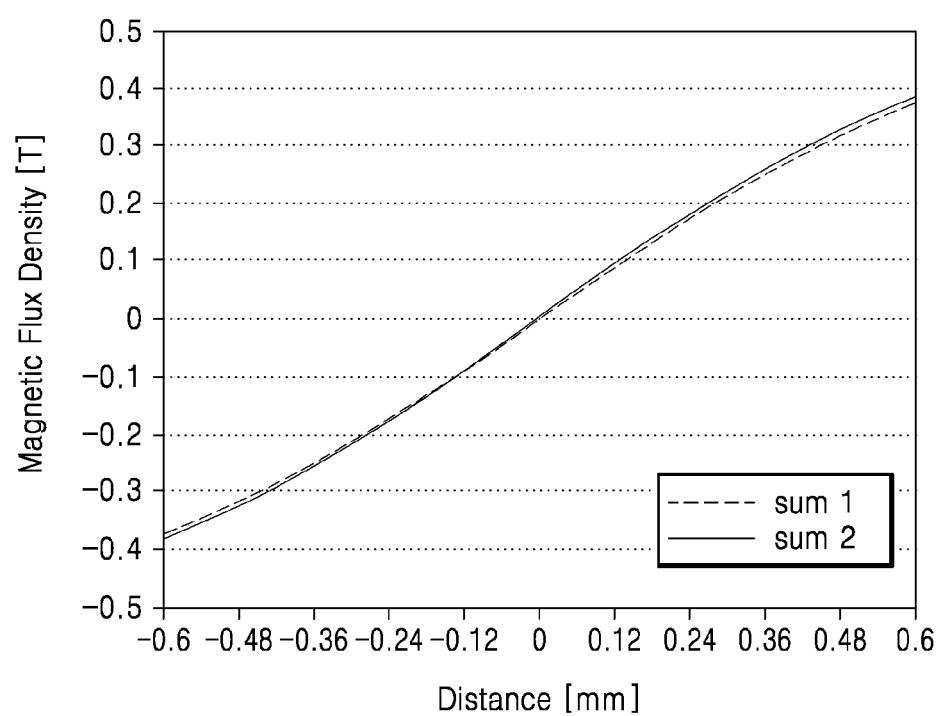
FIG. 12 is a graph showing a third magnetic flux density which is a sum of first and second magnetic flux densities detected by third sensors illustrated in FIGS. 11A and 11B, according to a position of a second sub-moving frame in a second direction, according to an embodiment.

FIG. 11A is a graph showing a magnetic flux density detected by the third sensors 161 and 162 of FIG. 10A according to positions of the third magnets 241a and 241b in the second direction (y-axis direction), and FIG. 11B is a graph showing a magnetic flux density detected by the third sensors 161 and 162 of FIG. 10B according to position of the third magnets 241a and 241b in the second direction (y-axis direction). FIG. 12 is a graph showing a third magnetic flux density which is a sum of first and second magnetic flux densities detected by the third sensors 161 and 162 illustrated in FIGS. 11A and 11B, according to a position of the second sub-moving frame 240 in the second direction (y-axis direction), according to an embodiment.

Referring to FIGS. 11A and 11B, according to the position of the second sub-moving frame 240 in the second direction (y-axis direction), patterns of the first and second magnetic flux densities detected by the third 161 and 162 vary according to distances between the third sensors 161 and 162 and the third magnets 241a and 241b in the first direction (x-axis direction). For example, a pattern of the first magnetic flux density detected by the third sensor 161 when the distance between the third sensor 161 and the third magnet 241a along the first direction (x-axis direction) is 0.7 mm is different from a pattern of the second magnetic flux density detected by the third sensor 162 when the distance between the third sensor 162 and the third magnet 241b in the first direction (x-axis direction) is 0.8 mm. Also, a pattern of the first magnetic flux density detected by the third sensor 161 when the distance between the third sensor 161 and the third magnet 241a along the first direction (x-axis direction) is 0.9 mm is different from a pattern of the second magnetic flux density detected by the third sensor 162 when the distance between the third sensor 162 and the third magnet 241b along the first direction (x-axis direction) is 0.9 mm.

However, referring to FIG. 12, the third magnetic density (sum1, sum2) which is a sum of the magnetic flux densities detected by the third sensors 161 and 162 exhibit substantially the same patterns, regardless of the position of the second sub-moving frame 240 along the first direction (x-axis direction). The third magnetic flux density (sum1) is a sum of the first magnetic flux density detected by the third sensor 161 and the second magnetic flux density detected by using the third sensor 162 of FIG. 11A, and the third magnetic flux density (sum2) is a sum of the first magnetic flux density detected by the third sensor 161 and the second magnetic flux density detected by the third sensor 162 of FIG. 11B. The third magnetic flux density (sum1, sum2) which is a sum of the first magnetic flux density and the second magnetic flux density has a constant value regardless of a movement of the first magnet 211 in the first direction (x-axis direction). The third magnetic flux density (sum1, sum2) having a constant value according to a position of the third magnets 241a and 241b in the second direction (y-axis direction) means that even when the third magnets 241a and 241b are moved in the first direction (x-axis direction), an error of the third magnetic flux density detected at the same position in the second direction (y-axis direction) is less than up to 2.9%.

Thus, even when the third magnets 241a and 241b are located at different positions in the first direction (x-axis direction) as illustrated in FIGS. 8A and 8B, a third magnetic flux density which is a sum of magnetic flux densities detected by the third sensor 161 and the third sensor 162 is constant according to a position of the third magnets 241a and 241b in the second direction (y-axis direction).

Accordingly, a position information generating unit (not shown) may compare the third magnetic flux density which is the sum of the first magnetic flux density detected by the third sensor 161 and the second magnetic flux density detected by the third sensor 162 with a predetermined reference value, thereby generating position information of the third magnets 241a and 241b in the second direction (y-axis direction). For example, the position information generating unit may compare the third magnetic flux density which is the sum of the first magnetic flux density detected by the third sensor 161 and the second magnetic flux density detected by using the third sensors 162 with a predetermined reference value according to the position of the third magnets 241a and 241b in the second direction (y-axis direction), thereby generating or determining position information of the third magnets 241a and 241b in the second direction (y-axis direction). As the third magnets 241a and 241b are fixed to the second sub-moving frame 240, position information of the second sub-moving frame 240 may be generated or determined based on position information of the third magnets 241a and 241b in the second direction (y-axis direction). The reference value may be a preset value based on the third magnetic flux density in the second direction illustrated in FIG. 10.

The position information generating unit may include a memory unit that stores a preset reference value according to movement of the third magnets 241a and 241b in the second direction (y-axis direction) and a position determining unit that determines position information of the third magnets 241a and 241b along the second direction (y-axis direction) by comparing the third magnetic flux density with the reference value.

A magnetic flux density is used as an example of a detection signal detected by a magnetic sensor in the current embodiment. However, an electrical signal or the like may also be used.

Table 1 below shows results of a position movement of the moving frame 200 of the camera module of FIG. 2 in a positive direction or a negative direction of the second direction (y-axis direction). A current was supplied to the third driving coils 130a and 130b to move the third magnets 241a and 241b in a positive direction of the second direction (y-axis direction) nine times and in a negative direction of the second direction (y-axis direction) nine times when the moving frame 200 was at a reference position (Offset=0 um), when the moving frame 200 was spaced apart from the reference position a distance of +100 um in the first direction (x-axis direction) (Offset=+100 um), and when the moving frame 200 was spaced apart from the reference position a distance of −100 um in the first direction (x-axis direction) (Offset=−100 um), respectively. When moving the third magnets 241a and 241b in the second direction (y-axis direction), position information of the third magnets 241a and 241b in the second direction (y-axis direction) generated based on the sum of detection signals detected by the third sensors 161 and 162 was used.

TABLE 1

| Frequency | Moving distance [um] of moving frame in the second direction when Offset = 0 um | | Moving distance [um] of moving frame in the second direction when Offset = +100 um | | Moving distance [um] of moving frame in the second direction when Offset = −100 um | |
|---|---|---|---|---|---|---|
| | positive direction | negative direction | positive direction | positive direction | negative direction | positive direction |
| 1 | 10 | 9 | 10 | 10 | 9 | 10 |
| 2 | 9 | 10 | 10 | 11 | 9 | 9 |
| 3 | 9 | 9 | 11 | 11 | 10 | 9 |
| 4 | 10 | 9 | 11 | 10 | 8 | 9 |
| 5 | 9 | 10 | 11 | 11 | 9 | 10 |
| 6 | 11 | 9 | 10 | 10 | 9 | 9 |
| 7 | 11 | 9 | 10 | 10 | 10 | 8 |
| 8 | 10 | 8 | 11 | 11 | 10 | 9 |
| 9 | 9 | 8 | 9 | 10 | 10 | 9 |
| Average | 9.8 | 9.0 | 10.3 | 10.4 | 9.3 | 9.1 |

Referring to Table 1, even when a position of the moving frame 200 varies in the first direction (x-axis direction), when a predetermined current was applied to the third driving coils 130a and 130b, the moving frame 200 was moved uniformly within a range of about 8 to 11 um which is a predetermined range in the second direction (y-axis direction). An average distance was about 9.0 um to about 10.4 um.

Regarding the uniform position movement of the moving frame 200 in the second direction (y-axis direction) as shown in Table 1, it is assumed that an accurate position detection of the moving frame 200 takes place in the second direction (y-axis direction). Accordingly, based on the uniform position movement of the moving frame 200 in the second direction (y-axis direction) in a predetermined range, it may be indirectly confirmed that positions of the third magnets 241a and 241b may be accurately detected based on the sum of detection signals detected by the third sensors 161 and 162.

Figure 13:
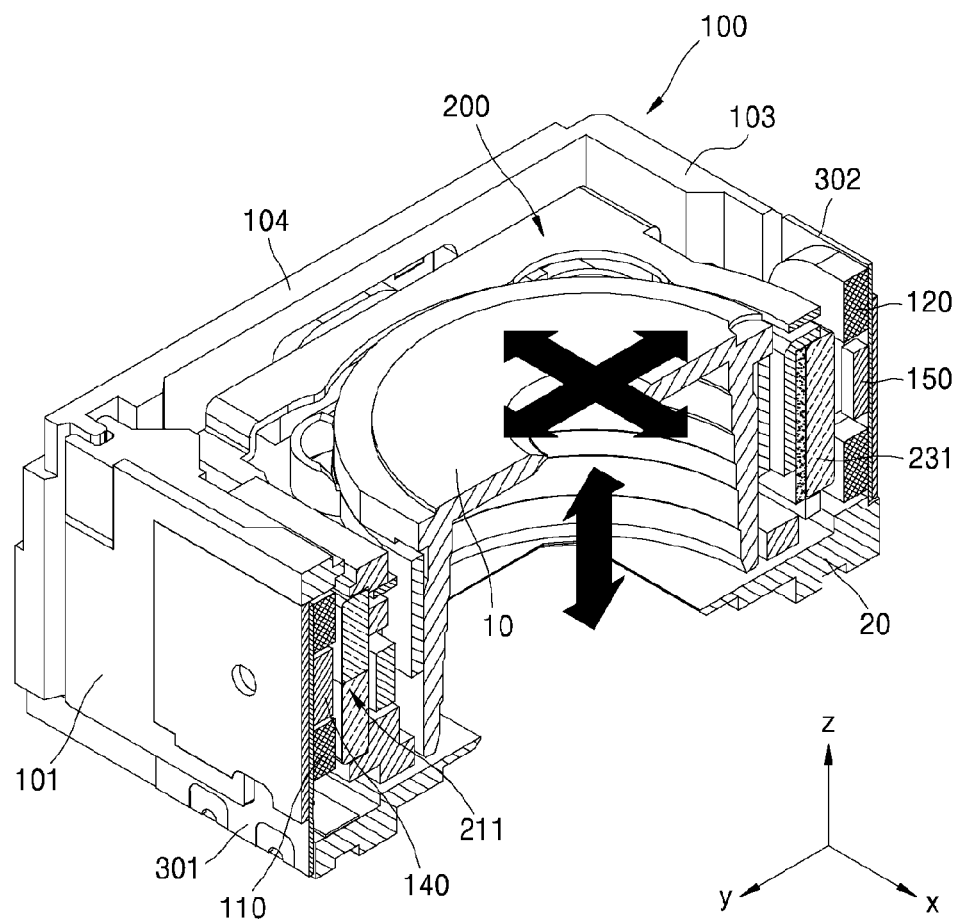
FIG. 13 is a cross-sectional perspective view of the camera module of FIG. 1 cut along a line XIII-XIII'.
Figure 14:
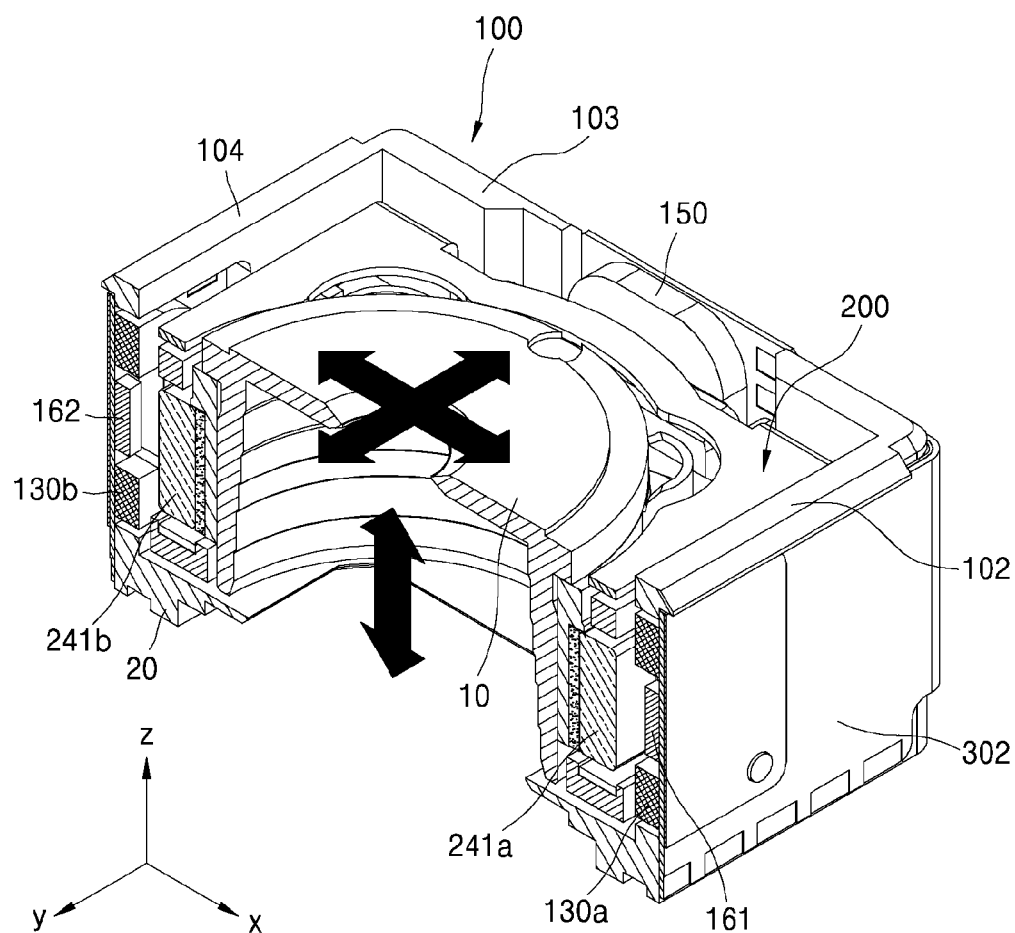
FIG. 14 is a cross-sectional perspective view of the camera module of FIG. 1 cut along a line XIV-XIV'.

FIG. 13 is a cross-sectional perspective view of the camera module of FIG. 1 cut along a line XIII-XIII'; and FIG. 14 is a cross-sectional perspective view of the camera module of FIG. 1 cut along a line XIV-XIV'.

Referring to FIG. 13, the first driving coil 110 and the first sensor 140 are included in the first sidewall 101 of the fixed frame 100, and the first magnet 211 is disposed in the moving frame 200 to correspond to the first driving coil 110 and the first sensor 140. The first driving coil 110 and the first magnet 211 are spaced apart from each other in the second direction (y-axis direction) perpendicular to an optical axis. Also, the second driving coil 120 and the second sensor 150 are included in the third sidewall 103 of the fixed frame 100, and the second magnet 231 is disposed in the moving frame 200 to correspond to the second driving coil 120 and the second sensor 150. The second driving coil 120 and the second sensor 150 are also spaced apart from each other in the second direction (y-axis direction) perpendicular to the optical axis. The first driving coil 110 and the first sensor 140 are electrically connected to the first printed circuit board 301, and the second driving coil 120 and the second sensor 150 are electrically connected to the second printed circuit board 302.

Referring to FIG. 14, the third driving coils 130a and 130b and the third sensors 161 and 162 are included the second sidewall 102 and the fourth sidewall 104 of the fixed frame 200, respectively, and the third magnets 241a and 241b are disposed in the moving frame 200 to correspond to the third driving coils 130a and 130b and the third sensors 161 and 162. The third driving coils 130a and 130b and the third magnets 241a and 241b are spaced apart from each other in the first direction (x-axis direction) that is perpendicular to the optical axis. The pair of the driving coils 130a and 130b and the pair of the third sensors 161 and 162 are electrically connected to the second printed circuit board 302.

When a current is supplied to one of the first and second driving coils 110 and 120 and the third driving coils 130a and 130b via the first and second printed circuit boards, the first and second magnets 211 and 231 and third magnets 241a and 241b that are spaced apart from the first and second 110 and 120 and the third driving coils 130a and 130b in a direction perpendicular to the optical axis are moved in a predetermined direction. When a current is supplied to the first driving coil 110, the first magnet 211 is moved in the optical axis direction (z-axis direction). Also, when a current is supplied to the second driving coil 120, the second magnet 231 is moved in the first direction (x-axis direction), and when a current is supplied to the third driving coils 130a and 130b, the third magnets 241a and 241b are moved in the second direction (y-axis direction). The current may be individually or simultaneously supplied to the first and second driving coils 110 and 120 and the third driving coils 130a and 130b.

While the first and second magnets 211 and 231 and the third magnets 241a and 241b are moved, the fixed frame 100 to which the first and second printed circuit boards 301 and 302 are electrically connected is fixed to the base 20 and is not moved, and thus, tension variation of the first and second printed circuit boards 301 and 302 is not caused while the moving frame 200 to which the first and second magnets 211 and 231 and the third magnets 241a and 241b are mounted is moved. Accordingly, the moving frame 200 may be accurately moved without being affected by the tension variation applied to the first and second printed circuit boards 301 and 302.

In addition, by spacing the first and second 110 and 120 and the third driving coils 130a and 130b apart from the first and second magnets 211 and 231 and the third magnets 241a and 241b in a direction perpendicular to the optical axis, a thickness of the camera module in the optical axis direction may be reduced. In detail, even when the first and second magnets 211 and 231 and the third magnets 241a and 241b have larger thicknesses, the thickness of the camera module in the optical axis direction may not increase.

In the above-described embodiment, the first sub-moving frame 230 is moved in the first direction (x-axis direction), and the second sub-moving frame 240 is moved in the second direction (y-axis direction), but the embodiments are not limited thereto. For example, in contrast to the above-described embodiment, the first sub-moving frame 230 may be moved in the second direction (y-axis direction), and the second sub-moving frame 240 may be moved in the first direction (x-axis direction). Also, while a voice coil motor (VCM) method in which an electromagnetic force generated between a coil and a magnet is used to drive the moving frame 200 is used in the above-described embodiment, other methods for driving the moving frame 200, for example, an ultrasonic wave motor method using a piezoelectric element or a method of driving the moving frame 200 by applying a current to a shape memory alloy may also be used.

According to the camera module of the above-described embodiments, a printed circuit board is connected to a fixed frame for three-axis driving, thereby providing an Auto Focus (AF) function and an Optical Image Stabilization (OIS) function whereby a lens may be precisely moved and a tension variation in the printed circuit board may be prevented or minimized.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A camera module comprising:
   a lens barrel including at least one lens group;
   a moving frame that mounts the lens barrel and is movable in an optical axis direction, and in a first direction and a second direction that are perpendicular to the optical axis direction;
   a fixed frame that movably supports the moving frame and provides the moving frame with a driving force:
   in the optical axis direction;
   in the first direction; and
   in the second direction,
   wherein the fixed frame comprises a plurality of sidewalls that surround side portions of the moving frame;
   a printed circuit board disposed on a sidewall of the plurality of sidewalls, wherein the printed circuit board provides current to the fixed frame; and
   a base that fixes the fixed frame and comprises an image sensor that is spaced apart from the at least one lens group in the optical axis direction;
   wherein the fixed frame further comprises:
   a first driving coil for moving the moving frame in the optical axis direction;
   a second driving coil for moving the moving frame in the first direction; and
   third driving coils for moving the moving frame in the second direction.

2. The camera module of claim 1, wherein:
   the moving frame comprises first, second, and third magnets respectively corresponding to the first, second, and third driving coils.

3. The camera module of claim 2, wherein the printed circuit board supplies a current to the first, second, and third driving coils to move the moving frame.

4. The camera module of claim 2, wherein the first, second, and third driving coils are respectively spaced apart from the first, second, and third magnets in a direction perpendicular to the optical axis direction.

5. The camera module of claim 2, wherein the first, second, and third driving coils are disposed in sidewalls of the fixed frame.

6. The camera module of claim 2, wherein the fixed frame comprises a hole into which at least one of the first, second, and third driving coils is inserted.

7. The camera module of claim 2, wherein the moving frame comprises a groove portion into which at least one of the first, second, and third magnets is inserted.

8. The camera module of claim 2, wherein the moving frame comprises:

a first moving frame that is movably supported by the fixed frame in the optical axis direction; and a second moving frame that is movably supported by the first moving frame in the first and second directions.

9. The camera module of claim 8, wherein:

a plurality of ball bearings are disposed between the fixed frame and the first moving frame; and a guide groove that guides the plurality of ball bearings in the optical axis direction is formed in at least one of the fixed frame and the first moving frame.

10. The camera module of claim 8, wherein:

a plurality of ball bearings are disposed between the first moving frame and the second moving frame; and a guide groove that guides the plurality of ball bearings in the first direction or the second direction is formed in at least one of the first moving frame and the second moving frame.

11. The camera module of claim 8, wherein the second moving frame comprises:

a first sub-moving frame that is moved in the first direction, wherein the second magnet is disposed at a side of the first sub-moving frame; and a second sub-moving frame that is moved in the second direction, wherein the third magnets are disposed at two sides of the second sub-moving frame.

12. The camera module of claim 11, wherein:

the second sub-moving frame is movably supported by the first sub-moving frame in the second direction; and the first sub-moving frame is movably supported by the first moving frame in the first direction.

13. The camera module of claim 12, wherein:

a plurality of ball bearings are disposed between the first sub-moving frame and the second sub-moving frame; and a guide groove that guides the plurality of ball bearings in the second axis direction is formed in at least one of the first sub-moving frame and the second sub-moving frame.

14. The camera module of claim 12, wherein:

a plurality of ball bearings are disposed between the first sub-moving frame and the first moving frame; and a guide groove that guides the plurality of ball bearings in the first direction is formed in at least one of the first sub-moving frame and the first moving frame.

15. The camera module of claim 12, wherein the first sub-moving frame comprises a detour portion to make a detour with respect to the third magnets.

16. The camera module of claim 15, wherein the detour portion and the third magnets are spaced apart from each other.

17. The camera module of claim 11, wherein the first moving frame comprises a yoke that is disposed to correspond to the third magnets that prevents the second moving frame from detaching therefrom.

18. The camera module of claim 11, wherein the fixed frame comprises first, second, and third sensors that correspond to the first, second, and third magnets, respectively.

19. The camera module of claim 18, wherein the first, second, and third sensors are magnetic sensors.

20. The camera module of claim 19, wherein the first sensor detects a position of the first magnet in the optical axis direction.

21. The camera module of claim 19, wherein the second sensor detects a position of the second magnet in the first direction.

22. The camera module of claim 19, wherein the third sensors detect a position of the third magnets in the second direction.

23. The camera module of claim 22, wherein:

the third magnets are disposed at two sides in the first direction of the second moving frame; and the third sensors are disposed at two sides in the first direction of the fixed frame.

24. The camera module of claim 23, wherein a position of the moving frame in the second direction is detected based on:

a first detection signal detected by one of the third sensors; and a second detection signal detected by other of the third sensors.

25. The camera module of claim 24, wherein a position of the moving frame in the second direction is detected based on a third detection signal which is a sum of the first detection signal and the second detection signal.

26. The camera module of claim 23, wherein a sum of a distance between one of the third sensors and one of the third magnets in the first direction and a distance between the other of the third sensors and the other of the third magnets is constant.

27. The camera module of claim 1, wherein tension of the printed circuit board remains constant while the moving frame moves.

* * * * *